V. C. LUPPERT.
CASTER ATTACHING BEARING BOX.
APPLICATION FILED JULY 14, 1909.
933,999.
Patented Sept. 14, 1909.
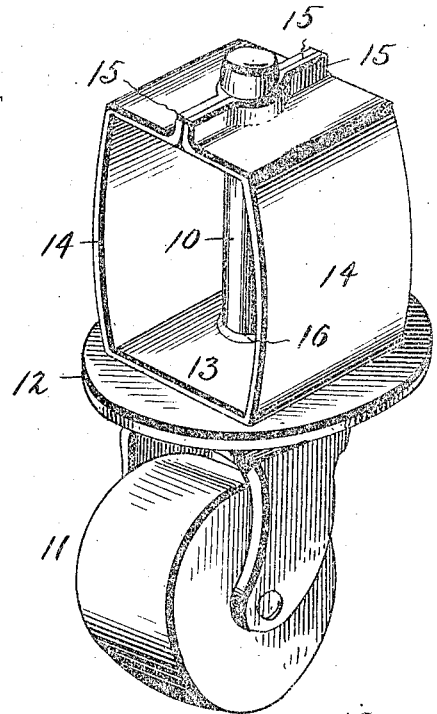
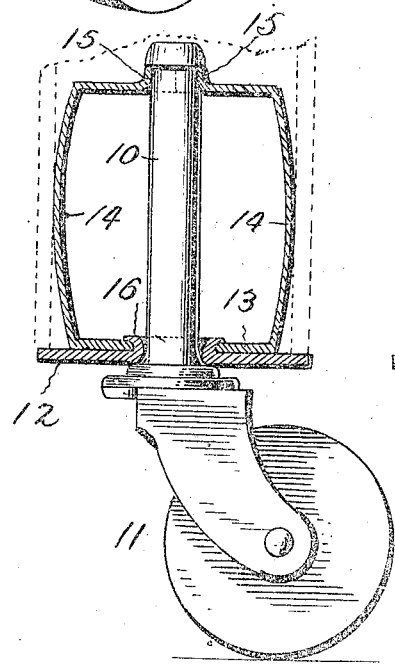
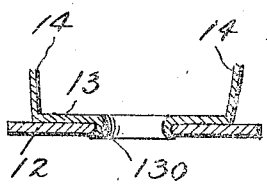
Witnesses
Inventor
Valentine C. Luppert,
By
Attorney

UNITED STATES PATENT OFFICE.

VALENTINE C. LUPPERT, OF WILLIAMSPORT, PENNSYLVANIA.

CASTER-ATTACHING BEARING-BOX.

933,999.

Specification of Letters Patent. Patented Sept. 14, 1909.

Application filed July 14, 1909. Serial No. 507,322.

*To all whom it may concern:*

Be it known that I, VALENTINE C. LUPPERT, a citizen of the United States, residing at Williamsport, in the county of Lycoming and State of Pennsylvania, have invented certain new and useful Improvements in Caster-Attaching Bearing-Boxes, and do hereby declare that the following is a full, clear, and exact description of the same, reference being had to the annexed drawings, making a part of this specification, and to the figures of reference marked thereon.

My invention relates more particularly to casters used upon iron or metal bedsteads, and my object is to provide an attaching pintle bearing box capable of being inexpensively made, and involving no alteration in the caster pintle, and which may be easily applied to the bed post and yet securely held thereto, and to this end my invention consists in the device constructed substantially as hereinafter specified and claimed.

In the accompanying drawings, Figure 1 is a perspective view of a caster embodying my invention; Fig. 2 a vertical section; and Fig. 3 a detail view in section showing a different construction for joining the frame and washer from that shown in Fig. 2.

As far as the matter of the pintle or pivot post 10, the wheel 11, and its pivotal connection with the pintle 10, are concerned, the caster is of ordinary construction, and indeed one of the objects of my invention is to make unnecessary any alteration in the caster in those regards.

The bearing box comprises a disk or washer 12 corresponding to the disk ordinarily employed, on which the lower end of the bed post rests, an open frame of spring or elastic sheet metal having a base piece 13 engaging the upper side of the disk or washer, two vertical sides 14 that are preferably bowed or bulged outwardly, or convex on their outer sides, and a top formed of two inwardly extending flanges 15, whose edges meet on a plane passing transversely through the axis of the caster pintle, each of said flanges having a semi-cylindrical hole through which the caster pintle passes. The abutting edges of the two top flanges are turned upward, so as to afford extending bearing surfaces for the contact of one flange against the other, to prevent said edges overlapping or passing each other, and also to afford a good bearing for the pintle, and the upturning of said edges forms an enlarged rounded opening on the under side of the top which facilitates the thrusting of the pintle end or head therethrough in assembling the caster and box. The top end of the pintle is enlarged or provided with a head so that when the head is thrust through the box top as described, the top flanges or the upturned edges thereof will engage the shoulder thus formed on the pintle and secure the box and pintle together against accidental separation, although when desirable for any reason, the box can be readily detached from the pintle simply by expanding the box at the top to clear the pintle head.

The washer or disk 12 and the bottom 13 of the box, of course, require to be perforated for the passage of the pintle, and I utilize this necessity to provide a simple and yet efficient means of uniting the disk and the spring frame. This I do by offsetting or projecting the stock forming the edge of the hole in one of said parts that is passed through the hole in the other part and upset or turned down over the surface thereof, thus forming a hollow or tubular rivet 16 that is integral with one part to join the two parts together. Thus, the stock around the hole in the disk or washer may be pressed upward, and being protruded through the hole in the frame bottom 13 have its portion projecting above the top surface of said bottom upset or riveted down; or the tubular rivet may thus be formed on the bottom of the spring frame and projected downward through the opening in the disk or washer. The surface of the tubular rivet next the pintle thus formed, is rounded convexly, or outward from the pintle, and makes an excellent bearing for the pintle to turn in.

It will be understood that the bulging side walls of the box while enabling the easy insertion of the box into the bed post, produce all required friction to hold the caster to the post.

An important advantage of my construction is that since the bed post engaging disk or washer is attached to or forms a part of the box, the caster wheel and pintle may be easily detached therefrom, so that in the event of breaking of the caster wheel, it is necessary merely to provide a new wheel and pintle, and the dealer with the same socket can furnish any style of wheel whether wood, iron, glass, etc., that the customer may desire.

Having thus described my invention, what I claim is—

1. An attaching device for casters, comprising a washer and a pintle-engaging member composed of a base and upwardly extending pintle-engaging parts, said washer and base abutting and joined together by a tubular rivet integral with one of said parts, and projecting through an opening in the other part and upset therein, said tubular rivet forming a pintle-receiving opening.

2. An attaching device for casters, comprising a washer and a pintle-engaging member composed of a base and upwardly extending pintle-engaging parts, said washer and base abutting and joined together by a tubular rivet integral with one of said parts, and projecting through an opening in the other part and upset thereon, said tubular rivet forming a pintle-receiving opening, the inner surface of the tubular rivet being convexly rounded.

3. An attaching device for casters, comprising a washer, a frame having a bottom member, vertical members, and a top composed of inwardly-projecting pintle-engaging flanges, the bottom member and said washer being in engagement, and a tubular rivet integral with one of said parts, uniting the washer and said bottom member.

4. An attaching device for casters, comprising a box having spring side members, with inwardly turned flanges, the abutting edges of said flanges being offset said flanges being free of each other and movable with the respective spring side members to move into and out of engagement with the pintle, whereby the box and pintle may be connected and separated at will.

5. An attaching device for casters, comprising a box having spring side members, with inwardly turned flanges at the top, the edges of said flanges being extended upwardly and each flange being provided with a semi-cylindrical hole for the caster pintle said flanges being free of each other and movable with the respective spring side members to move into and out of engagement with the pintle, whereby the box and pintle may be connected and separated at will.

In testimony whereof I affix my signature in presence of two witnesses.

VALENTINE C. LUPPERT.

Witnesses:
 HUGH GILMORE,
 BESSIE THOMPSON.